United States Patent [19]
Ledon et al.

[11] Patent Number: 6,001,324
[45] Date of Patent: Dec. 14, 1999

[54] PROCESS FOR THE PREPARATION OF AN ULTRA PURE HYDROGEN PEROXIDE SOLUTION BY ION EXCHANGE IN THE PRESENCE OF ACETATE IONS

[75] Inventors: Henry Ledon; Christine Devos, both of Versailles, France

[73] Assignee: L'Air Liquide, Societe Anonyme pour l'Etude et l'Exploitation des Procedes Georges Claude, Paris, France

[21] Appl. No.: 08/862,961

[22] Filed: Jun. 3, 1997

[30] Foreign Application Priority Data

May 27, 1997 [FR] France .................................. 97 06469

[51] Int. Cl.$^6$ ................................................. C01B 15/01
[52] U.S. Cl. ................................................. 423/584
[58] Field of Search ............................................. 423/584

[56] References Cited

U.S. PATENT DOCUMENTS

| 3,074,782 | 1/1963 | Meeker et al. |
|---|---|---|
| 3,294,488 | 12/1966 | Dunlop et al. ........................... 423/584 |
| 4,999,179 | 3/1991 | Sugihara et al. ......................... 423/584 |
| 5,733,521 | 3/1998 | Minamikawa et al. .................. 423/584 |

FOREIGN PATENT DOCUMENTS

| 774 442 | 5/1997 | European Pat. Off. |
| 51025 | 8/1965 | Germany . |
| 09071406 | 3/1997 | Japan . |
| WO96/39237 | 12/1996 | WIPO . |

*Primary Examiner*—Wayne Langel
*Attorney, Agent, or Firm*—Burns, Doane, Swecker & Mathis, L.L.P.

[57] ABSTRACT

Provided is a process for the preparation of an ultrapure hydrogen peroxide solution to be purified through at least one bed of anion-exchange adsorbents and at least one bed of cation-exchange adsorbents. The at least one bed of anion-exchange adsorbents contains carboxylate ion of formula R—COO$^-$ in which R represents a hydrogen atom, an aryl radical containing from 6 to 10 carbon atoms or an alkyl radical containing from 1 to 4 carbon atoms. The aryl and alkyl radicals are either unsubstituted or substituted by one or more fluorine atoms. A first bed of the at least one bed of anion-exchange adsorbents through which the solution to be purified passes is a bed containing carboxylate ions of formula R—COO$^-$. Also provided is a plant for the implementation of the inventive process.

12 Claims, No Drawings

PROCESS FOR THE PREPARATION OF AN ULTRA PURE HYDROGEN PEROXIDE SOLUTION BY ION EXCHANGE IN THE PRESENCE OF ACETATE IONS

BACKGROUND OF THE INVENTION

1. Field of the Invention

The invention relates to a process for the preparation of an ultra pure hydrogen peroxide solution, and to a plant for the implementation of the process.

2. Description of the Related Art

The use of hydrogen peroxide for advanced technology applications or applications in the food industry, in hygiene or health requires increasingly pure products which must meet a growing number of increasingly tight specifications. In particular, the demands of users are turning towards hydrogen peroxide solutions in which the content of each metal impurity is less than one part per billion (ppb) and preferably less than 500 parts per trillion (ppt). In the following account, such solutions will be known as ultrapure hydrogen peroxide solutions.

It is well known, according to the prior art, that it is possible to remove certain impurities by passing the solution through a bed of ion-exchange adsorbents. Mention may be made, for example, of functionalized polymers of polystyrene/divinylbenzene type, silicas or aluminosilicates, in particular the varieties containing controlled micropores, such as zeolites or active charcoals; these solids carry functional groups capable of complexing either cations or anions. Mention may be made, as examples of functional groups capable of complexing cations, of the carboxylic, sulphonic, phosphonic, hydroxide, amine oxide or phosphine oxide groups or alternatively of cyclic or open polyoxaalkyls, such as, for example, ethylene oxide polymers. Mention may be made, as examples of functional groups capable of complexing anions, of the quaternary ammonium or quaternary phosphonium groups. These adsorbents can also be obtained by polymerization of a monomer carrying a functional group, for example poly (methacrylic acid)s, poly(vinylphosphonic acid)s, polyvinylpyridines, polyvinylpyrrolidones, poly(vinyl alcohol)s, saponified polylactones and copolymers containing these units. The adsorbents which are the most often described are polystyrene gels or crosslinked polystyrenes possessing sulphonic $—SO_3H$ or trimethylammonium $(CH_3)_3N^+—$ functional groups.

Many combinations have been provided, such as, for example, anionic resin followed by cationic resin or cationic resin followed by anionic resin or aternatively anionic resin followed cationic resin followed by cationic+anionic "mixed bed". Additions to the inter-stage phases are also described, such as, for example, She addition of acid in order to modify the pH or the addition of chelating agents, such as aminomethylenecarboxylic or aminomethylenephosphonic derivatives.

It is well known to the person skilled in the art that the use of anion-exchange adsorbents presents great difficulties when employed for the purification of hydrogen peroxide. In particular, the hydroxide form, under which these products are generally available industrially, cannot be used directly because of its excessively high basicity, resulting in significant decomposition of hydrogen peroxide. Many publications describe the use of adsorbents exchanged by carbonate or bicarbonate ions, which are less basic, in order to limit the decomposition of hydrogen peroxide, without, however, eliminating it completely.

It is essential to be able to control this phenomenon of decomposition of hydrogen peroxide on adsorbent beds because, as this decomposition with release of gaseous oxygen is exothermic, the rate is accelerated according to the well known Arrhenius law. The formation of a gas pocket can further aggravate the phenomenon since, by separating the liquid from the decomposition point, the heat released can no longer be removed by evaporation of the water and the cooling effect of the liquid is lost. Such a process is characteristic of a divergent reaction which can result in an extremely violent autoaccelerated decomposition reaction, which is all the more dangerous since it is highly exothermic and produces gaseous oxygen, thus with a considerable expansion force which can cause explosions.

SUMMARY OF THE INVENTION

The object of the present invention is thus to obtain ultrapure hydrogen peroxide solutions while limiting the risk of violent decomposition of the hydrogen peroxide during the purification stages.

The subject of the present invention is a process for the preparation of an ultrapure hydrogen peroxide solution, characterized in that:

a) it comprises at least one sequence which includes passing the solution to be purified through at least one bed of anion-exchange adsorbents (AEA) and at least one bed of cation-exchange adsorbents (CEA)

b) at least one bed of anion-exchange adsorbents contains carboxylate ions of formula $R—COO^-$ in which R represents a hydrogen atom, an aryl radical containing from 6 to 10 carbon atoms or an alkyl radical containing from 1 to 4 carbon atoms, the said aryl and alkyl radicals being either unsubstituted or substituted by one or more fluorine atoms, and c) the first (AEA) bed which the solution to be purified passes through is a bed containing carboxylate ions of formula $R—COO^-$.

DETAILED DESCRIPTION OF THE PREFERRED EMBODIMENTS OF THE INVENTION

Carboxylate ion of formula $R—COO^-$ is understood to mean in particular the trifluoroacetate ion or the benzoate ion, the formate ion, the acetate ion or the fluoroacetate ion, and preferably the acetate ion.

The hydrogen peroxide solution to be purified according to the present invention is a technical aqueous solution having a concentration of 1 to 70% by weight and preferably of 5 to 50% by weight. The adsorbents are chosen from those which are described above.

The beds of absorbents each exhibit a height to diameter ratio of between 0.5 and 50, preferably greater than 3, in particular between 5 and 10 and more particularly of 6.

The hydrogen peroxide solution through puts, expressed as volume of solution/hour passed per volume of bed of adsorbent, can vary between 0.5 and 100, preferably from 1 to 50 and more particularly from 10 to 30.

The bed(s) of anion-exchange adsorbents will preferably be fed in an upward mode, whereas the bed(s) of cation-exchange adsorbents will preferably be fed in a downward mode. It is possible to define the geometries of the beds so that the true space velocities and/or throughputs in each adsorbent are optimized.

It is also possible to operate under pressure; a working pressure of less than 5 atmospheres above atmospheric pressure will preferably be chosen.

The temperature of the solution to be purified according to the process as described above is less than or equal to 30° C. and preferably between −10° C. and +10° C.

In a preferred alternative form of the process as defined above, the sequence for passing the solution to be purified through the ion-adsorbing beds begins with passage through a bed of anion adsorbents (AEA) and continues with passage through a bed of cation adsorbents (CEA).

In another alternative form of the process as defined above, the process comprises, upstream or downstream of sequences for passing the solution to be purified through the beds of ion-exchange adsorbents, one or more purification stages, such as, for example, distillation, liquid extraction, crystallization, absorption, filtration, ultrafiltration, nanofiltration or reverse osmosis. If appropriate, the starting solution is brought beforehand to the desired assay and then purified. Depending on the degree of purity and of dilution of the hydrogen peroxide solution to be purified, one or more of these additional stages is/are employed.

In a first preferred alternative form of the present invention, the technical hydrogen peroxide solution to be purified, which is at a concentration of 30% to 70% by weight, is distilled and brought to the desired assay beforehand and then purified through at least two beds of ion-exchange adsorbents, according to the sequence which is the subject of the present invention.

According to a second alternative form of the purification process which is the subject of the present invention, a hydrogen peroxide solution of technical quality or of so-called "food" quality, having a concentration of approximately 50 to 70% by weight, is subjected to the following pretreatment: a first distillation/concentration stage, in order to obtain a condensate having a concentration of greater than 80%, plus a first purification by low-temperature crystallization and the removal of the supernatant. The crystals collected are washed, superficially dried and then melted and the solution obtained is diluted to 30 or 35% with deionized water of ultrapure electronic quality.

In a third preferred alternative form of the present invention, in particular if the carbon content of the hydrogen peroxide solution is a constraint forming an integral part of the required specifications, a second bed of anion-exchange absorbents can be added to the purification line in order to retain the carboxylate ions released by the complexation of the metal impurities in the first bed of anion-exchange adsorbents.

It is thus possible very easily to obtain, from an ordinary technical quality, a hydrogen peroxide solution of "electronic" quality containing less than 200 ppt of each of the metal cations from groups IA to VIIA (with the exception of oxygen) and from groups IB to VIII of the table of the Periodic Classification of the Elements.

Mention may be made, by way of illustration of the purification process which is the subject of the present invention, of, for example, the series of sequences: AEA (acetate)/CEA/AEA (bicarbonate or carbonate)/CEA.

Another subject of the invention is a plant for the implementation of the process as defined above.

In a preferred alternative form of the present plant, the beds of anion-exchange adsorbents are fed in upward mode and the beds of cation-exchange adsorbents are fed in downward mode.

In another preferred alternative form of the plant, the latter is situated on the customer's site, such as, for example, a site for the manufacture of electronic components, and connected directly to the point of use of the hydrogen peroxide by the said customer. In this alternative form, the hydrogen peroxide solution to be purified can originate from a storage tank situated on the same site, or alternatively is manufactured on this same site by virtue of a so-called "on site" production unit.

EXAMPLES

The following examples illustrate the invention without, however, limiting it.

EXAMPLE A

Stability Study

It has been shown that the phenomenon of initiation of a violent decomposition reaction by simple heating of a bed of anion-exchange resin in the trimethylammonium bicarbonate form (Dowex A 550 UPE) in the presence of a 30% aqueous hydrogen peroxide solution at moderate temperature, for example 30 to 35° C., for a few tens of minutes is much faster with a resin which has been used for the purification of the peroxide than with a freshly exchanged resin. If the "TMR" (time to maximum rate), which indicates, at a given temperature, the induction period before initiation of the explosive decomposition, is taken as evaluation parameter, the following results were obtained:

fresh resin:
T=56° C.: TMR=15 min; T=51° C.: TMR=30 min; T=44° C: TMR=60 min used resin:
T=41° C.: TMR=15 min; T=35° C.: TMR=30 min; T=32 C.: TMP=60 min It is thus obvious that a used resin is much more sensitive to hydrogen peroxide autodecomposition phenomena, probably because of the catalytic effect of the metal species exchanged during purification.

Under the same conditions, no decomposition phenomenon is observed when an anion-exchange resin in the acetate form is heated for 12 hours at 45° C. in the presence of a 30% aqueous hydrogen peroxide solution.

EXAMPLE B a) Comparative Example

A purification unit contains two columns filled respectively with 3 litres of an anion-exchange resin Dowex Monosphere A 550 UPE, which has been exchanged beforehand with a sodium bicarbonate solution and washed with water, and 3 litres of a cation-exchange resin Dowex Monosphere C 650 UPN. The diameter of the columns is approximately 11.7 centimetres, which gives a height of 28 centimetres. 900 litres of a 30% by weight aqueous hydrogen peroxide solution (solution A), obtained by diluting a 60% by weight commercial solution with ultrapure water, are introduced with a throughput of 130 litres per hour, in upward mode, into the first column charged with an (AEA) bed and then, in downward mode, into the second column charged with a (CEA) bed. The solution B is obtained.

b) Example According to the Invention

The purification operation is carried out as in the preceding example, from a fresh sample of 900 litres of solution A, but by exchanging the anion-exchange resin Dowex Monosphere A 500 UPE beforehand with a sodium acetate solution. The solution C is obtained.

Analysis of these three solutions for the purpose of determining the concentrations, expressed in ppt, of the main contaminants leads to the following results:

|    | Solution A | Solution B | Solution C |
|----|-----------|-----------|-----------|
| Na | 675,000   | 55        | 26        |
| Ca | 1700      | 85        | 21        |
| Fe | 900       | 40        | 70        |
| NI | 350       | 15        | 6         |
| Cr | 200       | 7         | 2         |
| Cu | 44        | 6         | 7         |
| Nn | 30        | 0.5       | 0.3       |

The preceding examples demonstrate that the decomposition of hydrogen peroxide on an (AEA) bed in the acetate form is much lower than that observed on a resin exchanged in the (bicarbonate or carbonate) form; they also demonstrate that the elements capable of decomposing $H_2O_2$, namely Fe, Ni, Cr, Cu and Mn, are completely retained on this same (AEA) bed.

What is claimed is:

1. A process for the preparation of an ultrapure hydrogen peroxide solution, the process comprising:
   at least one sequence which includes passing a hydrogen peroxide solution to be purified through at least one bed of anion-exchange adsorbents and at least one bed of cation-exchange adsorbents;
   wherein a first bed of the at least one bed of anion-exchange adsorbents through which the solution to be purified passes containes carboxylate ions of formula R—COO$^-$ in which R represents a hydrogen atom, an aryl radical containing from 6 to 10 carbon atoms or an alkyl radical containing from 1 to 4 carbon atoms, the aryl an alkyl radicals being either unsubstituted or substituted by one or more fluorine atoms, said carboxylate ions being formed by preconditioning the anion-exchange adsorbents with a solution prior to said step of passing said hydrogen peroxide solution.

2. The process according to claim 1, wherein the carboxylate ion of formula R—COO$^-$ is a formate ion, an acetate ion, a fluoroacetate ion, a trifluoroacetate ion or a benzoate ion.

3. The process according to claim 2, wherein the carboxylate ion of formula R-COO$^-$ is an acetate ion.

4. The process according to claim 1, wherein the at least one sequence begins with passage of the solution to be purified through a bed of anion-exchange adsorbents followed by passage through a bed of cation-exchange adsorbents.

5. The process according to claim 1, further comprising, upstream and/or downstream of the at least one sequence, one or more purification stages, and optionally, a prior operation in which said solution to be purified is brought to a desired concentration.

6. The process according to claim 5, wherein the one or more purification stages are selected from the group consisting of distillation, liquid extraction, crystallization, absorption, filtration, ultrafiltration, nanofiltration and reverse osmosis.

7. The process according to claim 5, wherein the solution to be purified is a technical hydrogen peroxide solution at a concentration of 30% to 70% by weight, said solution being distilled and brought to a desired concentration in a prior operation.

8. The process according to claim 5, wherein the solution to be purified is a technical quality or food quality hydrogen peroxide solution at a concentration of approximately 50 to 70% by weight, said solution being subjected to a pretreatment as follows:
   a distillation/concentration stage to obtain a condensate having a concentration of greater than 80%;
   purification of the condensate by low-temperature crystallization and removal of a supernatant;
   collecting, washing, superficially drying and melting the obtained crystals; and
   diluting the melted crystals to 30 to 35% with deionized water of ultrapure electronic quality.

9. The process according to claim 1, wherein two successive sequences are performed, the first sequence comprising passing the solution to be purified through a bed of anion-exchange adsorbents containing acetate ions followed by a bed of cation-exchange adsorbents, and the second sequence comprising passing the solution from the first sequence through a bed of anion-exchange adsorbents containing carbonate or bicarbonate ions followed by a bed of cation-exchange adsorbents.

10. The process according to claim 1, wherein each of said at least one bed of anion-exchange adsorbents and said at least one bed of cation-exchange adsorbents exhibits a height to diameter ratio of greater than 3.

11. The process according to claim 1, wherein the solution to be purified is fed to the at least one bed of anion-exchange adsorbents in an upward mode and said solution is fed to the at least one bed of cation-exchange adsorbents in a downward mode.

12. A process for the preparation of an ultrapure hydrogen peroxide solution, the process comprising:
   passing a hydrogen peroxide solution to be purified through at least one bed of anion-exchange adsorbents and at least one bed of cation-exchange adsorbents, wherein the anion-exchange adsorbents of a first bed of the at least one bed of anion-exchange adsorbents contain carboxylate ions of formula R—COO$^-$, formed by preconditioning the anion-exchange adsorbents with a solution prior to said step of passing said hydrogen peroxide solution, wherein R represents a hydrogen atom, an aryl radical containing from 6 to 10 carbon atoms or an alkyl radical containing from 1 to 4 carbon atoms, the aryl and alkyl radicals being either unsubstituted or substituted by one or more fluorine atoms.

* * * * *